O. M. CHAMBERLAIN.
Box Plaiting Attachments for Sewing-Machines.
No. 137,343. Patented April 1, 1873.

2 Sheets--Sheet 1.

Witnesses.
Frank Carrington
Thos. A. Macaulay

Inventor.
Orange M. Chamberlain

O. M. CHAMBERLAIN.
Box Plaiting Attachments for Sewing-Machines.

No. 137,343.  Patented April 1, 1873.

2 Sheets--Sheet 2.

Witnesses
Frank Carrington
Thos. A. McCauley

Inventor.
Orange M. Chamberlain

UNITED STATES PATENT OFFICE.

ORANGE M. CHAMBERLAIN, OF NEW YORK, N. Y., ASSIGNOR OF ONE-HALF HIS RIGHT TO WM. B. CARRINGTON, OF SAME PLACE.

IMPROVEMENT IN BOX-PLAITING ATTACHMENTS FOR SEWING-MACHINES.

Specification forming part of Letters Patent No. 137,343, dated April 1, 1873; application filed January 22, 1873.

*To all whom it may concern:*

Be it known that I, ORANGE M. CHAMBERLAIN, of the city, county, and State of New York, have invented a new and useful Improvement in Box-Plaiting Attachments for Sewing-Machines; and I do hereby declare that the following is a full, clear, and exact description thereof, which will enable others skilled in the art to make and use the same, reference being had to the accompanying drawing forming part of this specification.

Similar letters refer to like parts.

My invention relates to an attachment for sewing-machines for making a box-plait; and consists of two formers having an irregular reciprocating motion, operating partly against each other and against the presser-foot and cloth-plate of the sewing-machine. The size and form of the box-plaits may be varied.

Figures 1, 2:
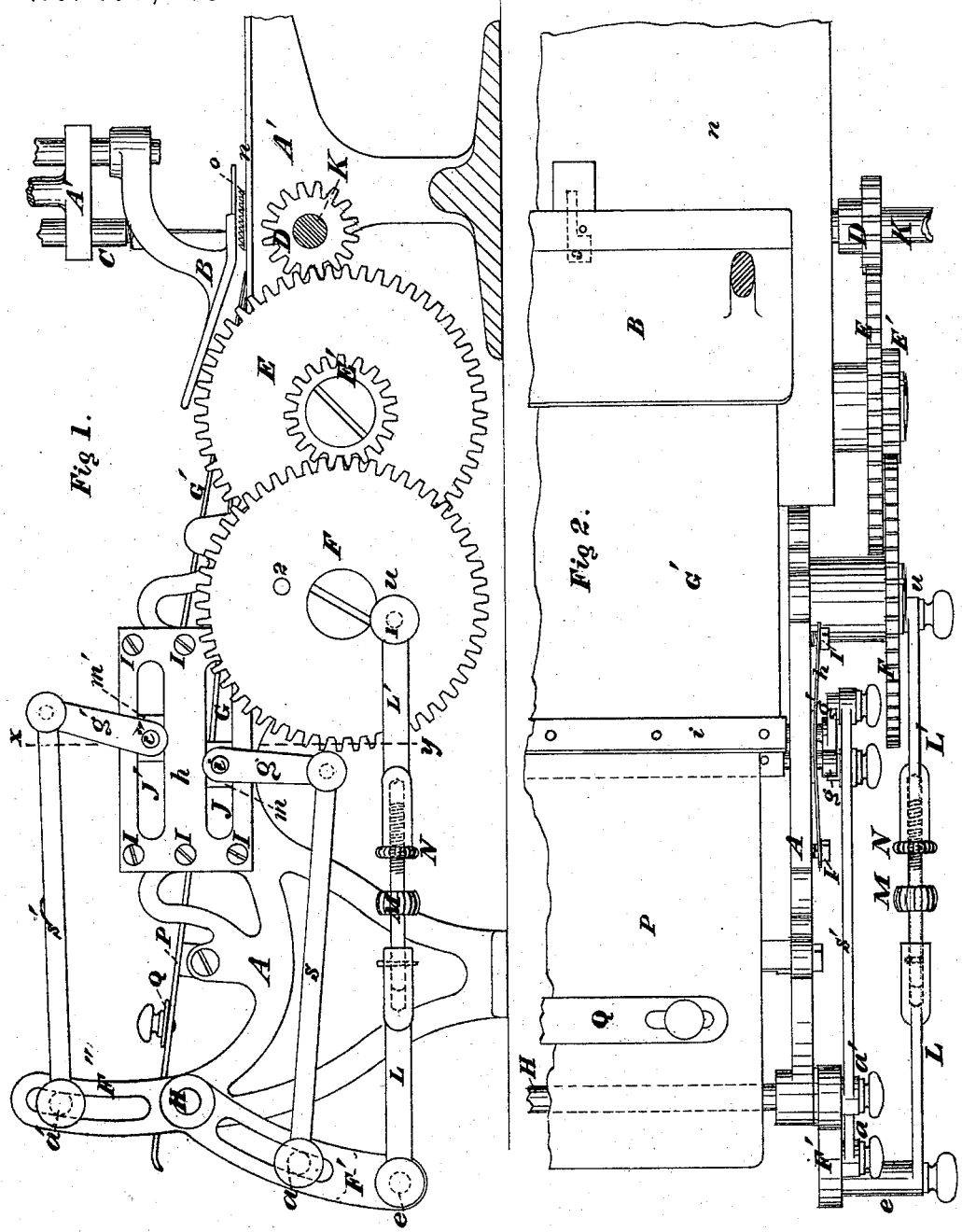
Figure 3:
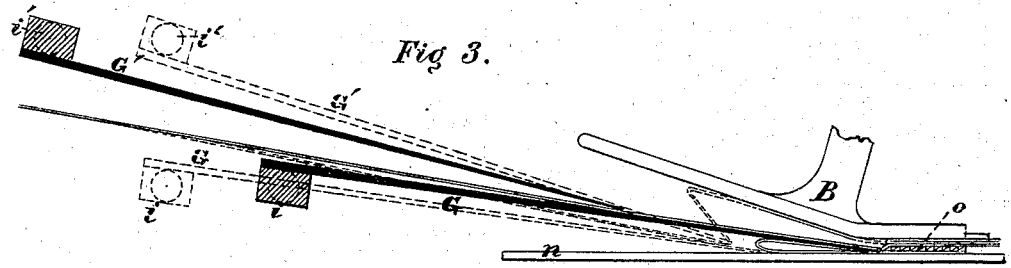
Figure 4:
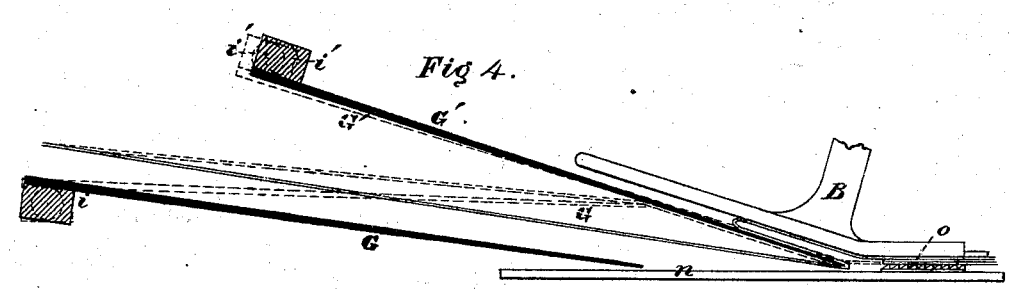
Figure 5:
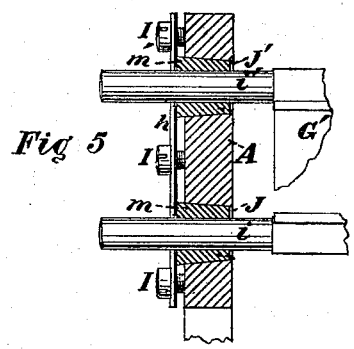
Figure 6:

Figure 1 is a side elevation of one side of the frame-work, the other side opposite the one shown being like it, and this frame-work is adjusted to the cloth-plate of the sewing-machine. The mechanism used to operate the formers and the manner of regulating the form and size of the box-plait are as follows: Fig. 2 is a plan of half of Fig. 1, the opposite side being an exact duplicate, with the exception of the wheels D E F and pitman L L'. Fig. 3 shows the position of the lower former after it has completed one-half of a box-plait. The dotted lines show the position of the upper formers as a plait is partly formed. Fig. 4 shows the position of the material and the two formers as the upper former has finished a full box-plait. The dotted lines show the position of the material and the two formers about to form another plait. Fig. 5 is a section through $x$ and $y$ of Fig. 1, showing the taper bearings and the friction-springs for retarding the forward motion of the formers until they press firmly on the material to be plaited; and for allowing the formers to be raised from the material before any return motion takes place. Fig. 6 is an edge view, showing the work performed with the plaits closer together at the top than at the bottom side.

A, Fig. 1, is the frame of the plaiter. A' is part of the sewing-machine frame. B is the presser-foot; C, the needle-bar; D, a pinion on the main shaft of the sewing-machine; E, an intermediate cog-wheel; E', pinion fixed to wheel E, and turns the cog-wheel F, which gives motion to the double rocker-arms F' F''. G G' are the formers; H, a shaft to which the rocker-arms are fixed. I I I I are set-screws for regulating the pressure on the bearings $m$ $m$. J J' are taper slots in the frame A, in which the bearings $m$ $m'$ slide; K, main shaft of sewing-machine; L L', connecting rod for adjusting the position of the formers so as to regulate the distance between the plaits at either side; M, screw with milled head for increasing the length of pitman L L'; N, lock-nut; P and Q, guides between which the cloth passes; O, feed of sewing-machine; $a$ $a'$, adjustable wrist-pins for changing size of plait; $g$ $g'$, arms on former-shafts; $h$, friction-spring; $i$ $i'$, shafts to which formers are fixed; $m$ $m'$, bearings for shafts $i$ $i'$; $n$, cloth-plate of sewing-machine; $p$ and $q$, box-plait with unequal spaces at top and bottom sides; S S', links communicating motion from rocker-arms to arms $g$ $g'$ on former-shafts. In Fig. 1, 2 is an extra hole to increase the throw of rocker-arms F' F''. The cloth to be plaited is passed under the guide Q and over the plate P, between the formers G G', and under the presser-foot B.

Motion being given to the sewing-machine, the pinion D, which is fixed to the shaft of the sewing-machine, moves the gear E, and the pinion E', which is fixed to the gear E, moves the gear F, to which one end of the pitman L L' is connected by the wrist-pin $u$ screwed into the wheel at 1. The rotation of the wheel F imparts motion to the double rocker-arm F' F'', to which the other end of the pitman L L' is connected by the wrist-pin $e$. The double rocker-arms F' F'' are secured to the shaft H, which is mounted in bearings in the frame A, one of the bearings being in the opposite side of the frame, (not shown.) At the other end of this shaft H, outside the bearing, is fixed another double rocker-arm, slotted the same as the one shown. The motion of the rocker-arms imparts a reciprocating motion through the links S S', the arms $g$ $g'$, the shafts $i$ $i'$, and formers G G' moving in the guide-slots J J'.

As the top former goes forward, forming half of a box-plait, the lower former comes back to its starting-point, and as the top former returns, after having made one-half of a box-plait, the feed of the sewing-machine carries the half plait already formed away to be stitched, and as the lower former comes forward it forms another half of, and completes, a box-plait. In this way a full box-plait is formed at every forward and backward movement of the formers G G'. The first movement of the arms $g\ g'$ is to turn the shafts $i\ i'$ in their bearings $m\ m'$, imparting no forward motion until the formers G G' are pressed firmly on the material, the bearings $m\ m'$ being tapered and fitting into the slots J J', also tapering. The pressure of the springs $h$ retards the forward motion until the formers are firmly on the goods, and prevents any return motion until the formers are raised from the material. When the return movement takes place the top former comes in contact with the presser-foot, and the bottom former comes in contact with the cloth-plate.

I have now fully and particularly described my invention and the manner of carrying it into effect; and what I claim, and desire to secure by Letters Patent, is—

1. In combination, the pitman L L' and rocking arms F' F'', connected, substantially as described, with the formers G G'.

2. The combination of the arms $g\ g'$ with the shafts $i\ i'$, springs $h$, and sliding bearings $m\ m'$, for the purpose described.

3. The combination of the wheels D E F with the adjustable pitman L L', rocking arms F' F'', links S S', arms $g\ g'$, and formers G G', for the purpose described.

ORANGE M. CHAMBERLAIN.

Witnesses:
  THOS. A. MACAULAY,
  F. CARRINGTON.